US010640660B2

(12) United States Patent
Xu et al.

(10) Patent No.: US 10,640,660 B2
(45) Date of Patent: May 5, 2020

(54) WATER-BASED HIGH-TEMPERATURE-RESISTANT TITANIUM-STEEL ANTI-BONDING COATING AND USE THEREOF

(71) Applicant: Pangang Group Research Institute Co., Ltd, Chengdu (CN)

(72) Inventors: Zhefeng Xu, Chengdu (CN); Haoqing Zheng, Chengdu (CN); Quan Xu, Chengdu (CN); Cong Xiao, Chengdu (CN); Jun Li, Chengdu (CN)

(73) Assignee: Pangang Group Research Institute Co., Ltd, Chengdu (CN)

( * ) Notice: Subject to any disclaimer, the term of this patent is extended or adjusted under 35 U.S.C. 154(b) by 0 days.

(21) Appl. No.: 16/320,296

(22) PCT Filed: Jun. 23, 2017

(86) PCT No.: PCT/CN2017/089662
§ 371 (c)(1),
(2) Date: Jan. 24, 2019

(87) PCT Pub. No.: WO2018/019062
PCT Pub. Date: Feb. 1, 2018

(65) Prior Publication Data
US 2019/0264041 A1    Aug. 29, 2019

(30) Foreign Application Priority Data
Jul. 27, 2016 (CN) .......................... 2016 1 0598677

(51) Int. Cl.
| *C09D 7/61* | (2018.01) |
| *C09D 7/65* | (2018.01) |
| *B21B 27/02* | (2006.01) |
| *C09D 163/00* | (2006.01) |
| *C09D 175/04* | (2006.01) |

(52) U.S. Cl.
CPC ................ *C09D 7/61* (2018.01); *B21B 27/02* (2013.01); *C09D 7/65* (2018.01); *C09D 163/00* (2013.01); *C09D 175/04* (2013.01)

(58) Field of Classification Search
CPC .......... C09D 7/61; C09D 175/04; C09D 7/65; C09D 163/00; C09D 5/18; C09D 133/00; B21B 27/02
USPC ....................................................... 524/430
See application file for complete search history.

(56) References Cited

U.S. PATENT DOCUMENTS

| 2006/0058436 A1* | 3/2006 | Kasler .................. C09D 175/04 524/261 |
| 2007/0166466 A1* | 7/2007 | Kashiwada ............ C09D 5/028 427/372.2 |
| 2010/0028582 A1 | 2/2010 | Joch et al. |

FOREIGN PATENT DOCUMENTS

| CN | 1281876 A | 1/2001 |
| CN | 1472273 A | 2/2004 |
| CN | 101445700 A | 6/2009 |
| CN | 103113768 A | 5/2013 |
| CN | 104151912 A | 11/2014 |
| CN | 104449391 A | 3/2015 |
| CN | 105195403 A | 12/2015 |
| CN | 105238216 A | 1/2016 |
| CN | 105969081 A | 9/2016 |
| WO | 2007076766 A2 | 7/2007 |

OTHER PUBLICATIONS

Guo et al. Improvement on hot extrusion process of pure titanium tube. Machinery Manufacturing 53 vol. 610, pp. 71-73 (2015) (Article ID: 1000-4998(2015)06-0071-03).
English Abstract for CN 1281876 A (2001).
English Abstract for CN 1472273 A (2004).
English Abstract for CN 101445700 A (2009).
English Abstract for CN 103113768 A (2013).
English Abstract for CN 104151912 A (2014).
English Abstract for CN 104449391 A (2015).
English Abstract for CN 105195403 A (2015).
English Abstract for CN 105238216 A (2016).
English Abstract for CN 105969081 A (2016).

* cited by examiner

*Primary Examiner* — Doris L Lee
(74) *Attorney, Agent, or Firm* — Caesar Rivise, PC

(57) ABSTRACT

The invention relates to a coating for preventing intermetallic bonding, in particular to a water-based high-temperature-resistant titanium-steel anti-bonding coating and its use in the preparation process of titanium ingot. The water-based high-temperature-resistant titanium-steel anti-bonding coating of the invention includes the following components in parts by weight: 50-150 parts of water-based film-forming agent, 0-50 parts of Zn powder, 400-450 parts of $Al_2O_3$ powder, and 250-350 parts of talcum powder. The coating of the invention can avoid the bonding reaction with a roller or a winch of the steel equipment in the rolling or perforation process of a titanium tube at 900° C., so as to improve the yield and the production efficiency of titanium material processing. Moreover, the process is simple and easy to operate, the coating is environment-friendly and pollution-free, and easy to prepare.

12 Claims, No Drawings

WATER-BASED HIGH-TEMPERATURE-RESISTANT TITANIUM-STEEL ANTI-BONDING COATING AND USE THEREOF

CROSS-REFERENCE TO RELATED APPLICATIONS

This application is a U.S. National Phase Application of PCT/CN2017/089662, filed Jun. 23, 2017, which claims priority to 201610598677.9, filed Jul. 27, 2016, the contents of which applications are incorporated herein by reference in their entireties for all purposes.

TECHNICAL FIELD

The invention relates to a coating for preventing intermetallic bonding, in particular to a water-based high-temperature-resistant titanium-steel anti-bonding coating and use thereof in the preparation process of titanium ingot.

BACKGROUND OF THE INVENTION

At present, it has not been reported that domestic manufacturers use high-temperature-resistant titanium-steel anti-bonding coating in the production of titanium tubes from titanium ingots and round billets. Titanium ingots and round billets must be kept in heating furnace at 900° C. for more than 4 h before they are pushed out of the heating furnace and rolled into titanium tubes. After titanium and its alloys are maintained at the high temperature of 900° C. for 4 h, the steel rolling equipment, roller way and rolling winch may become sticky to titanium. Finally, "under-fill" of varying depth will occur on the surface of titanium tubes. As both titanium tubes and titanium billets are perforated and rolled by rotation or in the high-speed rotation process, the titanium-based titanium alloys get easily sticky to iron and even generate TiFe phase due to their high-temperature characteristics. TiFe phase on the surface of titanium tubes will seriously affect the mechanical properties and microstructure of titanium material surface, and cause various defects such as loss and non-corrosion-resistance in the subsequent processing and use of titanium tubes. Besides, due to "titanium sticking", the equipment must be grinded before the subsequent titanium billets can be rolled again in the subsequent rolling process. If titanium tubes or titanium products cannot be continuously rolled, domestic manufacturers have to cut titanium tubes to ensure their inside & outside diameter accuracy and surface quality, which takes much time and energy. Moreover, titanium ingots are made from sponge titanium reaction; so, the cost and yield of titanium material will be seriously affected if the inner and outer parts of the titanium tubes are cut off. Therefore, it is necessary to apply a high-temperature-resistant titanium-steel anti-bonding coating.

In the prior art, the surface of each titanium ingot is sprayed and dried for a period of time before annealing treatment, which complicates the preparation process, prolongs the preparation time and impedes continuous and efficient production. In the rolling process of titanium tubes, the coating is applied to the surface of titanium ingot which cannot effectively prevent titanium-steel bonding due to the deformed titanium ingot. If the coating is directly sprayed on the surface of rolling winch, film formation and bonding effect are poor as the winch and the titanium ingot are made from different materials, so the titanium-steel bonding cannot be effectively avoided.

Therefore, in order to solve the above problems, a high-temperature-resistant anti-bonding coating with simple process and energy-saving and environment-friendly effect is urgently needed, so as to continuously and efficiently prepare titanium tubes, reduce defects, loss and production cost, and avoid equipment damage.

SUMMARY OF THE INVENTION

The technical problem to be solved by the invention is to provide a water-based high-temperature-resistant titanium-steel anti-bonding coating capable of reducing the surface defects and the production cost of titanium tubes, improving their surface quality and allowing continuous production.

The water-based high-temperature-resistant titanium-steel anti-bonding coating of the invention comprises the following components in parts by weight: 50-150 parts of water-based film-forming agent, 0-50 parts of Zn powder, 400-450 parts of $Al_2O_3$ powder, and 250-350 parts of talcum powder.

Further, as a preferred technical solution, the water-based high-temperature-resistant titanium-steel anti-bonding coating comprises the following components in parts by weight: 50-150 parts of water-based film-forming agent, 10-50 parts of Zn powder, 400-450 parts of $Al_2O_3$ powder, and 250-350 parts of talcum powder, and preferably comprising the following components in parts by weight: 100 parts of water-based film-forming agent, 50 parts of Zn powder, 450 parts of $Al_2O_3$ powder, and 350 parts of talcum powder.

Further, the water-based high-temperature-resistant titanium-steel anti-bonding coating further comprises the following components in parts by weight: 1-2 parts of curing agent, 0.5-1 part of dispersant and 1-5 parts of water; and preferably 1 part of curing agent, 0.5 part of dispersant and 5 parts of water.

Further, as a preferred technical solution, the water-based high-temperature-resistant titanium-steel anti-bonding coating consists of the following components in parts by weight: 50-150 parts of water-based film forming agent, 10-50 parts of Zn powder, 400-450 parts of $Al_2O_3$ powder, 250-350 parts of talcum powder, 1-2 parts of curing agent, 0.5-1 part of dispersant and 1-5 parts of water; and preferably, 100 parts of water-based film-forming agent, 50 parts of Zn powder, 450 parts of $Al_2O_3$ powder, 350 parts of talcum powder, 1 part of curing agent, 0.5 part of dispersant and 5 parts of water.

For the water-based high-temperature-resistant titanium-steel anti-bonding coating, wherein the water-based film-forming agent is at least one of epoxy resin, water-based polyurethane paint, water-based acrylic latex paint or water-based alkyd paint.

For the water-based high-temperature-resistant titanium-steel anti-bonding coating, wherein the curing agent is at least one of $SiO_2$, water glass or $Al_2(HPO_4)_3$, and preferably $SiO_2$; and the dispersant is at least one of polyvinyl alcohol, hydrolyzed maleic anhydride or barium stearate, and preferably polyvinyl alcohol.

Further, as a preferred technical solution, the pH value of the water-based high-temperature-resistant titanium-steel anti-bonding coating is 7.5-9.5; and the solid content is 85-90%, and preferably 87%.

The invention further provides a use of the water-based high-temperature-resistant titanium-steel anti-bonding coating in titanium tube rolling.

For the use of the water-based high-temperature-resistant titanium-steel anti-bonding coating in titanium tube rolling, at room temperature, the water-based high-temperatureresistant titanium-steel anti-bonding coating is coated on the surface of steel equipment, roller or winch to form a film layer with a thickness of 0.2-0.4 mm, and preferably 0.3 mm.

For the use of the water-based high-temperature-resistant titanium-steel anti-bonding coating in titanium tube rolling, the coating is used by air pressure spraying, vacuum spraying or manual brushing.

Compared with the prior art, the invention also has the following beneficial effects:

(1) The coating of the invention can avoid the bonding reaction with roller or winch of the steel equipment in the rolling or perforation process of titanium tube at 900° C., so as to improve the yield and the production efficiency of titanium material processing;

(2) The production process of the invention is simple and easy to operate, and is applicable to the production line equipped with air pressure spraying, vacuum spraying and brushing equipment;

(3) As a water-based environmental-friendly high-temperature-resistant anti-bonding coating, it does not contain harmful element restricted by RoHS quality or any toxic substance volatilized in the air, so as not to affect the environmental protection effect of construction environment;

(4) The water-based high-temperature-resistant titanium-steel anti-bonding coating of the invention can be immediately prepared on site before use; and the prepared coating can maintain stable for more than 6 months at room temperature.

DETAILED DESCRIPTION OF THE PREFERRED EMBODIMENT

The water-based high-temperature-resistant titanium-steel anti-bonding coating of the invention comprises the following components in parts by weight: 50-150 parts of water-based film-forming agent, 0-50 parts of Zn powder, 400-450 parts of $Al_2O_3$ powder, and 250-350 parts of talcum powder.

Further, as a preferred technical solution, the water-based high-temperature-resistant titanium-steel anti-bonding coating comprises the following components in parts by weight: 50-150 parts of water-based film-forming agent, 10-50 parts of Zn powder, 400-450 parts of $Al_2O_3$ powder, and 250-350 parts of talcum powder, and preferably comprising the following components in parts by weight: 100 parts of water-based film-forming agent, 50 parts of Zn powder, 450 parts of $Al_2O_3$ powder, and 350 parts of talcum powder.

Further, the water-based high-temperature-resistant titanium-steel anti-bonding coating comprises the following components in parts by weight: 1-2 parts of curing agent, 0.5-1 part of dispersant and 1-5 parts of water; and preferably 1 part of curing agent, 0.5 part of dispersant and 5 parts of water.

Further, as a preferred technical solution, the water-based high-temperature-resistant titanium-steel anti-bonding coating consists of the following components in parts by weight: 50-150 parts of water-based film forming agent, 10-50 parts of Zn powder, 400-450 parts of $Al_2O_3$ powder, 250-350 parts of talcum powder, 1-2 parts of curing agent, 0.5-1 part of dispersant and 1-5 parts of water; and preferably, 100 parts of water-based film-forming agent, 50 parts of Zn powder, 450 parts of $Al_2O_3$ powder, 350 parts of talcum powder, 1 part of curing agent, 0.5 part of dispersant and 5 parts of water.

For the water-based high-temperature-resistant titanium-steel anti-bonding coating, the water-based film-forming agent is at least one of epoxy resin, water-based polyurethane paint, water-based acrylic latex paint and water-based alkyd paint.

For the water-based high-temperature-resistant titanium-steel anti-bonding coating, the curing agent is at least one of $SiO_2$, water glass and $Al_2(HPO_4)_3$, and preferably $SiO_2$; and the dispersant is at least one of polyvinyl alcohol, hydrolyzed maleic anhydride and barium stearate, and preferably polyvinyl alcohol.

Further, as a preferred technical solution, the pH value of the water-based high-temperature-resistant titanium-steel anti-bonding coating is 7.5-9.5; and the solid content is 85-90%, and preferably 87%. In this way, a uniform high-temperature anti-bonding protective film layer can be formed on the surface of rolling equipment.

The invention further provides a use of the water-based high-temperature-resistant titanium-steel anti-bonding coating in titanium tube rolling.

For the use of the water-based high-temperature-resistant titanium-steel anti-bonding coating in titanium tube rolling, at room temperature, the water-based high-temperature-resistant titanium-steel anti-bonding coating is coated on the surface of steel equipment, roller or winch to form a film layer with a thickness of 0.2-0.4 mm, and preferably 0.3 mm. If the film layer attached to titanium tubes is less than 0.20 mm, the coating layer will be gradually reduced in thickness due to the rotation and adhesion of titanium ingot during rolling or perforation process. Therefore, in order to ensure sufficient coating thickness and prevent the coating layer from being completely adhered to titanium tubes, titanium tubes will not be fully protected against high-temperature oxidation. If the film layer attached to titanium tubes is more than 0.40 mm, the cost will increase.

For the application of the water-based high-temperature-resistant titanium-steel anti-bonding coating in titanium tube rolling, after the coating is coated on the surface of steel equipment, roller or winch by air pressure spraying, vacuum spraying or manual brushing, a formed film layer will be rapidly cured within 5-10 min at room temperature. No film layer flowing or sagging occurs because of high solid content. The coating adhesion of both wet film and dry film can meet the friction requirements of the vibrator with a titanium ingot roller way, without coating peeling or picking. There are no particular restrictions on coating method, drying method, etc. and coating method can be selected according to the actual situation on site.

The water-based high-temperature-resistant titanium-steel anti-bonding coating of the invention may be prepared by common methods in the art, as long as the components are uniformly mixed. The coating may be immediately prepared before use. However, the inventors of the invention found in their research that the components could be mixed more uniformly if the water-based high-temperature-resistant titanium-steel anti-bonding coating was preferably prepared by the following method: firstly, diluting the water-based film-forming agent with water, and slowly adding Zn powder, talcum powder and $Al_2O_3$ powder while stirring; adding curing agent, and uniformly stirring; then adding dispersant while stirring until a uniform and stable phase was obtained.

In the curing process, only the moisture attached to the surface of the coating should be removed, so no any accelerator is required. The coating is cured mainly by a natural curing method, and the hot air drying or induction heating can also be used to save curing time. The cured coating will not have any picking and cracking.

The high-temperature-resistant principle of the coating prepared by the invention is as follows: the organic coating is to burn off slowly and Fe is to get melted and soft slowly at the temperature of 900° C.; at this time, the $Al_2O_3$ powder in the coating can be fixed on the surface of roller or winch for heat insulation; and a $TiAl_3$ alloy layer is formed through the alloying reaction of Al and Ti in the coating. The alloy layer is so dense as to isolate the bonding reaction of the body titanium with external elements (Fe, etc.), thus achieving the effect of preventing titanium-steel bonding.

There is no special restrict on the temperature for using the high-temperature-resistant titanium-steel anti-bonding coating. However, since water is taken as the solvent of the treating agent of the invention, thus the high-temperature-resistant titanium-steel anti-bonding coating could be used at room temperature as long as water does not freeze and vaporize.

The invention provides a high-temperature-resistant titanium-steel anti-bonding coating that can be directly spraying on the surface of rolling winch on line and be quickly solidified to form a self-drying coating. By means of the coating, the surface of titanium tube will not bond with the surface of steel so as not to generate TiFe phase at the high temperature of 900° C. Thus, the production cost is effectively reduced, the production benefit is effectively improved, and particularly the precision size and the surface quality of the product are improved. The corresponding coating technology provided by the invention has good economic benefits, social benefits and wide application prospects.

The specific embodiments of the invention will be described in detail in combination with examples, and the invention is not limited to the scope of the described examples.

Example 1

The water-based high-temperature-resistant titanium-steel anti-bonding coating is prepared according to the raw materials and their weight ratios in Table 1:

TABLE 1

Raw materials and weight ratios of water-based high-temperature-resistant titanium-steel anti-bonding coating

| Raw materials | Water-based film forming agent/g | Zn powder/g | $Al_2O_3$ powder/g | Talcum powder/g | Curing agent/g | Dispersant/g | Water/g |
|---|---|---|---|---|---|---|---|
| K1 | 100 | 50 | 450 | 350 | 1 | 0.5 | 5 |
| K2 | 150 | 10 | 400 | 250 | 2 | 1 | 1 |
| K3 | 50 | 30 | 450 | 250 | 1 | 0.5 | 5 |
| K4 | 100 | 0 | 450 | 300 | 1 | 0.5 | 5 |
| K5 | 100 | 50 | 400 | 250 | 1 | 0.5 | 5 |
| D1 | 100 | 0 | 450 | 0 | 1 | 0.5 | 5 |
| D2 | 100 | 50 | 0 | 300 | 1 | 0.5 | 5 |

Among them, K1-K5 are the experimental groups, D1-D2 are the control groups, and a blank control group D3 (i.e. direct rolling without coating) is also arranged. The water-based film-forming agent is epoxy resin (solid content: 50%), the curing agent is $SiO_2$, and the dispersant is polyvinyl alcohol. The pH value of the water-based high-temperature-resistant titanium-steel anti-bonding coating prepared by the invention is 7.5-9.5, and the solid content is 85-90%.

The preparation method comprises the following steps: adding the water-based film-forming agent, Zn powder, talcum powder and $Al_2O_3$ powder to a container at normal temperature and pressure while continuously and uniformly stirring; then adding a curing agent, a dispersant and water until the solution presents a uniform stable phase, i.e. the water-based high-temperature-resistant titanium-steel anti-bonding coating.

The water-based high-temperature-resistant titanium-steel anti-bonding coating prepared in the above groups is coated on the surface of steel equipment, roller or winch by air pressure spraying, vacuum spraying or manual brushing, and is naturally dried and cured at room temperature for 10-15 min to obtain a film layer with a thickness of 0.2-0.4 mm. The titanium tube is rolled at 900° C. The surface quality of the rolled titanium tube is good, and the titanium tube is not attached to the roller and winch. The specific comparison is as follows:

TABLE 2

Test performance of water-based high-temperature-resistant titanium-steel anti-bonding coating and control groups

| No. | Surface defect rate of titanium tube due to titanium bonding (%) | Thickness of TiFe layer on titanium tube surface (μm) | Titanium bonding rate on equipment surface (%) |
|---|---|---|---|
| K1 | 1 | 9 | 1 |
| K2 | 2 | 10 | 2 |
| K3 | 3 | 11 | 3 |
| K4 | 5 | 13 | 4 |
| K5 | 9 | 22 | 11 |
| D1 | 12 | 23 | 13 |
| D2 | 24 | 46 | 26 |
| D3 | 35 | 249 | 54 |

As can be seen from Table 2, the titanium tubes produced by the equipment sprayed with the coating of groups K1 to K5 indicate good surface quality and hardly adhere to the roller, winch and etc.; the titanium tubes produced by the equipment without any coating (i.e. the blank control group D3) have serous surface defects and the equipment must be grinded before use due to a certain degree of titanium bonding; and the titanium tubes produced by the equipment with the coating of groups D1 and D2 have high surface detect rate and cannot effectively prevent titanium-steel bonding.

In case an annual production capacity of 10,000 ton is designed, about 6,300 titanium ingots will be produced each year as per the standard of 1.5 ton per titanium ingot (blank); and 100 to 200 kg will be cut from each titanium ingot as per the titanium-steel bonding depth of 5 mm to 20 mm; and the cutting part of each titanium ingot due to titanium bonding will cause a loss of 8,000-1,6000 yuan as per the price of 80,000 yuan/ton of titanium ingot. In addition, the cutting work will consume a great deal of manpower and material resources, and increase additional production cost and production time. The technology may save a large amount of production cost for titanium tubes and other titanium alloy products. Given that 2-5 kg of coating are used in the rolling process of each titanium ingot and the price of each coating is 200,000 yuan/ton, the new benefits of this technology are shown in the following formula:

W—Production of titanium ingots per year: about 6,300 titanium ingots per year are produced on the basis of 10,000 tons;

A—Amount of each titanium ingot cut due to titanium-steel layer bonding: based on 50 kg/titanium ingot;

P1—Cost of titanium ingot: 80 yuan/Kg;

W1—Consumption of sprayed high-temperature-resistant anti-bonding coating, 3 Kg/ingot;

P2—Price per ton of high-temperature-resistant anti-bonding coating: based on 200 yuan/kg;

Y—New benefits from this technology every year:

Then $$Y = (P1 \times A - W1 \times P2) \times W$$
$$= (4000 - 600) \times 6300$$
$$= 2142 \ (10,000 \ \text{yuan})$$

Therefore, the coating of the invention has good economic benefits, social benefits and wide application prospects.

The invention claimed is:

1. A water-based high-temperature-resistant titanium-steel anti-bonding coating, comprising the following components in parts by weight:
   50-150 parts of a water-based film-forming agent,
   0-50 parts of a Zn powder,
   400-450 parts of an $Al_2O_3$ powder,
   250-350 parts of a talcum powder,
   1-2 parts of a curing agent,
   0.5-1 part of a dispersant, and
   1-5 parts of water.

2. The water-based high-temperature-resistant titanium-steel anti-bonding coating according to claim 1, comprising the following components in parts by weight:
   50-150 parts of the water-based film-forming agent,
   10-50 parts of the Zn powder,
   400-450 parts of the $Al_2O_3$ powder,
   250-350 parts of the talcum powder,
   1-2 parts of the curing agent,
   0.5-1 part of the dispersant, and
   1-5 parts of water.

3. The water-based high-temperature-resistant titanium-steel anti-bonding coating according to claim 1 consisting of the following components in parts by weight:
   50-150 parts of the water-based film forming agent,
   10-50 parts of the Zn powder,
   400-450 parts of the $Al_2O_3$ powder,
   250-350 parts of the talcum powder,
   1-2 parts of the curing agent,
   0.5-1 part of the dispersant and
   1-5 parts of water.

4. The water-based high-temperature-resistant titanium-steel anti-bonding coating according to claim 1, wherein the water-based film-forming agent is at least one of epoxy resin, water-based polyurethane paint, water-based acrylic latex paint or water-based alkyd paint.

5. The water-based high-temperature-resistant titanium-steel anti-bonding coating according to claim 1, wherein the curing agent is at least one of $SiO_2$, water glass or $Al_2(HPO_4)_3$, and the dispersant is at least one of polyvinyl alcohol, hydrolyzed maleic anhydride or barium stearate, and preferably polyvinyl alcohol.

6. The water-based high-temperature-resistant titanium-steel anti-bonding coating according to claim 1, wherein a pH value of the water-based high-temperature-resistant titanium-steel anti-bonding coating is 7.5-9.5; and the solid content is 85-90%.

7. The water-based high-temperature-resistant titanium-steel anti-bonding coating according to claim 1, comprising the following components in parts by weight:
   50-150 parts of the water-based film-forming agent,
   0-50 parts of the Zn powder,
   400-450 parts of the $Al_2O_3$ powder,
   250-350 parts of the talcum powder,
   1 part of the curing agent,
   0.5 part of the dispersant, and
   5 parts of water.

8. The water-based high-temperature-resistant titanium-steel anti-bonding coating according to claim 1 comprising the following components in parts by weight:
   50-150 parts of the water-based film-forming agent,
   10-50 parts of the Zn powder,
   400-450 parts of the $Al_2O_3$ powder,
   250-350 parts of the talcum powder,
   1 part of the curing agent,
   0.5 part of the dispersant, and
   5 parts of water.

9. The water-based high-temperature-resistant titanium-steel anti-bonding coating according to claim 1 comprising the following components in parts by weight:
   100 parts of the water-based film-forming agent,
   50 parts of the Zn powder,
   450 parts of the $Al_2O_3$ powder,
   350 parts of the talcum powder,
   1-2 parts of the curing agent,
   0.5-1 part of the dispersant, and
   1-5 parts of water.

10. The water-based high-temperature-resistant titanium-steel anti-bonding coating according to claim 1 comprising the following components in parts by weight:
    100 parts of the water-based film-forming agent,
    50 parts of the Zn powder,
    450 parts of the $Al_2O_3$ powder,
    350 parts of the talcum powder,
    1 part of the curing agent,
    0.5 part of the dispersant, and
    5 parts of water.

11. A method of titanium tube rolling, said method comprising coating the water-based high-temperature-resistant titanium-steel anti-bonding coating according to claim 1 on a surface of steel equipment, roller or winch to form a film layer with a thickness of 0.2-0.4 mm.

12. The method according to claim 11, wherein the coating is applied by air pressure spraying, vacuum spraying or manual brushing.

\* \* \* \* \*